United States Patent
Nishino

(10) Patent No.: US 9,367,068 B2
(45) Date of Patent: Jun. 14, 2016

(54) GAS/LIQUID TWO-PHASE FLOW STATE CONTROLLING DEVICE AND GAS/LIQUID TWO-PHASE FLOW STATE CONTROLLING METHOD

(75) Inventor: Giichi Nishino, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 309 days.

(21) Appl. No.: 14/348,367

(22) PCT Filed: Jul. 31, 2012

(86) PCT No.: PCT/JP2012/069453
§ 371 (c)(1),
(2), (4) Date: Mar. 28, 2014

(87) PCT Pub. No.: WO2013/046912
PCT Pub. Date: Apr. 4, 2013

(65) Prior Publication Data
US 2014/0224344 A1    Aug. 14, 2014

(30) Foreign Application Priority Data

Sep. 29, 2011   (JP) ................................. 2011-215119

(51) Int. Cl.
*F16K 31/02*   (2006.01)
*G05D 7/06*   (2006.01)
(Continued)

(52) U.S. Cl.
CPC .............. *G05D 7/0629* (2013.01); *F22B 35/00* (2013.01); *F22G 5/20* (2013.01); *Y10T 137/0368* (2015.04); *Y10T 137/6416* (2015.04)

(58) Field of Classification Search
CPC ......... G05D 7/0629; F22G 5/20; F22B 35/00; Y10T 137/0368; Y10T 137/6416; Y10T 137/7761; Y10T 137/0761; Y10T 137/0374
USPC .................. 137/487.5, 10, 11, 334; 73/64.44, 73/113.01, 25.04; 122/451.1
See application file for complete search history.

(56) References Cited

U.S. PATENT DOCUMENTS 3,908,897 A * 9/1975 van Holtz ............... F22B 35/00
                                                    122/448.1
4,576,036 A * 3/1986 Huang ...................... G01F 1/36
                                                      374/143
(Continued)

FOREIGN PATENT DOCUMENTS

CN       2068672 U     1/1991
CN       1274162 A    11/2000
(Continued)

OTHER PUBLICATIONS

Japanese Office Action dated Feb. 2, 2015, which issued during the prosecution of Japanese Patent Application No. 2011-215119, which corresponds to the present application.
(Continued)

*Primary Examiner* — Kevin Murphy
*Assistant Examiner* — Minh Le
(74) *Attorney, Agent, or Firm* — Troutman Sanders LLP

(57) ABSTRACT

A flow state controlling device controls, to a specified flow state, fluid of a gas/liquid two-phase flow that flows through a flow path. The flow state controlling device includes a pressure acquiring portion that acquires pressure information relating to pressure of the fluid, a mass velocity acquiring portion that acquires mass velocity information relating to a mass velocity of the fluid, a dryness fraction acquiring portion that acquires dryness fraction information relating to the dryness fraction of the fluid, and a controlling portion that controls, based on the pressure information, the mass velocity information and the dryness fraction information, a pressure controlling device that is able to change a pressure of the fluid, a mass velocity controlling device that is able to change a mass velocity of the fluid, and a heat controlling device that is able to change the latent heat of the fluid.

20 Claims, 9 Drawing Sheets

(51) Int. Cl.
*F22B 35/00* (2006.01)
*F22G 5/20* (2006.01)

(56) References Cited

U.S. PATENT DOCUMENTS

| | | | | |
|---|---|---|---|---|
| 4,876,897 A * | 10/1989 | DeCarlo | ................... | G01F 1/32 73/29.01 |
| 5,020,000 A * | 5/1991 | Carmichael | ............ | G01N 25/60 702/30 |
| 5,987,907 A * | 11/1999 | Morimoto | ............... | F25B 9/006 62/212 |
| 6,886,502 B1 * | 5/2005 | Srinivasan | ............ | F22B 35/004 122/451 R |
| 8,141,412 B2 * | 3/2012 | Chen | ........................ | G01F 1/74 73/25.04 |
| 8,419,833 B2 * | 4/2013 | Elms | .................. | B01D 19/0057 95/258 |
| 8,433,526 B2 * | 4/2013 | Roy | ................... | G01N 15/0205 250/227.11 |
| 8,645,069 B2 * | 2/2014 | Terychnyi | ............ | G01N 25/66 166/250.06 |
| 2006/0123923 A1 * | 6/2006 | Dutton | ...................... | G01F 1/74 73/861.354 |
| 2008/0041097 A1 * | 2/2008 | Oya | ...................... | F25B 39/028 62/525 |
| 2009/0178468 A1 * | 7/2009 | Guo | .......................... | F01K 7/20 73/25.04 |
| 2010/0077970 A1 * | 4/2010 | Kumar | ...................... | F22G 5/12 122/479.1 |
| 2010/0086287 A1 | 4/2010 | Rosenzweig et al. | | |
| 2011/0000281 A1 * | 1/2011 | Deacon | ................... | G01N 25/60 73/25.04 |
| 2012/0147375 A1 * | 6/2012 | Nishino | ............... | G01N 21/314 356/437 |
| 2013/0133751 A1 * | 5/2013 | Backi | ...................... | F01K 13/00 137/11 |

FOREIGN PATENT DOCUMENTS

| | | |
|---|---|---|
| CN | 101929671 A | 12/2010 |
| CN | 201795973 U | 4/2011 |
| JP | S62-56825 A | 3/1987 |
| JP | H1-98801 A | 4/1989 |
| JP | H5-141615 A | 6/1993 |
| JP | H08-312908 A | 11/1996 |
| JP | 2007-46812 A | 2/2007 |
| JP | 2007-315726 A | 12/2007 |
| JP | 2009-300002 A | 12/2009 |

OTHER PUBLICATIONS

Chinese Office Action dated Mar. 24, 2015, which issued during the prosecution of Chinese Patent Application No. 201280044372.3, which corresponds to the present application.

Written Opinion dated Oct. 2, 2012, which issued during the prosecution of International Application No. PCT/JP2012/069453, which corresponds to the present application.

International Search Report, dated Oct. 2, 2012, which issued during the prosecution of International Patent Application No. PCT/JP2012/069453, which corresponds to the present application.

* cited by examiner

GAS/LIQUID TWO-PHASE FLOW STATE CONTROLLING DEVICE AND GAS/LIQUID TWO-PHASE FLOW STATE CONTROLLING METHOD

CROSS-REFERENCE TO RELATED APPLICATIONS

This is a U.S. national phase application under 35 U.S.C. §371 of International Patent Application No. PCT/JP2012/069453, filed on Jul. 31, 2012, and claims benefit of priority to Japanese Patent Application No. JP 2011-215119, filed on Sep. 29, 2011. The International Application was published on Apr. 4, 2013, as International Publication No. WO 2013/046912 under PCT Article 21(2). The entire contents of these applications are hereby incorporated by reference.

FIELD OF TECHNOLOGY

Several aspects according to the present invention relate to a flow state controlling device and controlling method for controlling a flow state of a gas/liquid two-phase flow fluid.

BACKGROUND

Conventionally, there have been known fluid heating devices comprising a first heating heater for heating the upstream side of a pipeline through which a fluid flows, a second heating heater for heating the downstream side, an upstream-side temperature detecting device for detecting the temperature of the upstream side of the pipeline, a downstream-side temperature checking device for detecting the temperature on the downstream-side, a fluid temperature detecting device for detecting a temperature within the fluid, and a microcontroller for controlling the first heating heater and/or the second heating heater. See, for example, Japanese Unexamined Patent Application Publication No. 2007-46812 ("the JP '812"). In this pipe of fluid heating device, the microcontroller controls the first heating heater and the second heating heater independently based on the respective detected temperatures of the upstream-side temperature detecting device, the downstream-side temperature detecting device, and the fluid temperature detecting device. This can prevent the occurrence of a problem wherein a portion of the pipeline dries out, making it possible to produce heated fluids, such as saturated vapors and superheated vapors, and the like, efficiently.

However, the fluid heating device set forth in the JP '812 merely detects the temperatures of the pipe and the fluid to control the temperatures of the pipe and the fluid, so changing a gas/liquid two-phase fluid to a desired flow state, such as a saturated vapor, is difficult.

The several forms of the present invention contemplate the problem described above, and an aspect thereof is to provide a flow state controlling device and flow state controlling method wherein a gas/liquid two-phase flow fluid can be put easily into a desired flow state.

SUMMARY

A flow state controlling device according to the present invention controls, to a specified flow state, fluid of a gas/liquid two-phase flow that flows through a flow path. The flow state controlling device includes a pressure acquiring portion that acquires pressure information relating to pressure of the fluid, a mass velocity acquiring portion that acquires mass velocity information relating to a mass velocity of the fluid, a dryness fraction acquiring portion that acquires dryness fraction information relating to the dryness fraction of the fluid, and a controlling portion that controls, based on the pressure information, the mass velocity information and the dryness fraction information, a pressure controlling device that is able to change a pressure of the fluid, a mass velocity controlling device that is able to change a mass velocity of the fluid, and a heat controlling device that is able to change the latent heat of the fluid.

Given this structure, the controlling portion controls the pressure controlling device, the mass velocity controlling device, and the heat controlling device based on mass velocity information, pressure information, and dryness fraction information. Knowing the pressure, mass velocity, and dryness fraction of the gas/liquid two-phase fluid makes it possible to identify the flow state of the fluid from a Baker Chart. Moreover, the flow state of the fluid can be changed by changing the pressure, mass velocity, and/or dryness fraction of the fluid. Consequently, the controlling portion can change the pressure, mass velocity, and/or the dryness fraction of the gas/liquid two-phase fluid that is flowing in the flow path by controlling the pressure controlling device, the mass velocity controlling device, and the heat controlling device based on the mass velocity information, the pressure information, and the dryness fraction information, thus making it possible to create a specific (arbitrary) flow state of the fluid.

Preferably the controlling portion includes: a flow state detecting portion for detecting a flow state of the fluid at the current point in time based on the pressure information, the mass velocity information, and the dryness fraction information; and a drive controlling portion for driving the pressure controlling device, the mass velocity controlling device, and/or the heat controlling device based on the flow state at the current point in time and on the specified flow state.

Given this structure, the drive controlling portion drives the pressure controlling device, the mass velocity controlling device, and/or the heat controlling device based on the flow state at that point in time and the desired flow state. Here, if, in the Baker Chart, the flow state at the current point in time and the specific flow state are known, then it is possible to determine which, of the pressure, mass velocity, or dryness fraction, of the gas/liquid two-phase flow fluid should be increased or reduced. This makes it possible to cause the gas/liquid two-phase flow fluid that is flowing in the flow path to go to a desired flow state even more easily through the drive controlling portion driving the pressure controlling device, the mass velocity controlling device, and/or the heat controlling device based on the flow state at the current point in time and the desired flow state.

Preferably the drive controlling portion performs control so as to change the mass velocity of the fluid without changing the pressure or the dryness fraction of the fluid.

Given this structure, the drive controlling portion performs control so as to change the mass velocity of the gas/liquid two-phase flow fluid that flows in the flow path without changing the pressure or dryness fraction of the gas/liquid two-phase flow fluid that flows in the flow path. This makes it possible to change to the adjacent flow state in the vertical direction (the vertical axis direction) in the Baker Chart. Doing so makes it possible to change the gas/liquid two-phase flow fluid that flows in the flow path quickly and accurately from the current flow state to a desired flow state.

Preferably the drive controlling portion performs control so as to change the dryness fraction of the fluid without changing the pressure or the mass velocity of the fluid.

Given this structure, the drive controlling portion performs control so as to change the dryness fraction of the gas/liquid two-phase flow fluid that flows in the flow path without changing the pressure or mass velocity of the gas/liquid two-phase flow fluid that flows in the flow path. This makes it possible to change to the adjacent flow state in the horizontal direction (the horizontal axis direction) in the Baker Chart. Doing so makes it possible to change the gas/liquid two-phase flow fluid that flows in the flow path quickly and accurately from the current flow state to a desired flow state.

Preferably the drive controlling portion performs control so as to change the pressure and the dryness fraction of the fluid without changing the mass velocity of the fluid.

Given this structure, the drive controlling portion performs control so as to change the pressure and the dryness fraction of the gas/liquid two-phase flow fluid that flows in the flow path without changing the mass velocity of the gas/liquid two-phase flow fluid that flows in the flow path. This makes it possible to change to the adjacent flow state in the horizontal direction (the horizontal axis direction), along with changing the region of each flow pattern, in the Baker Chart. Doing so makes it possible to change the gas/liquid two-phase flow fluid that flows in the flow path quickly and accurately from the current flow state to a desired flow state.

Preferably the drive controlling portion performs control so as to change the mass velocity and the dryness fraction of the fluid without changing the pressure of the fluid.

Given this structure, the drive controlling portion performs control so as to change the mass velocity and the dryness fraction of the gas/liquid two-phase flow fluid that flows in the flow path without changing the pressure of the gas/liquid two-phase flow fluid that flows in the flow path. This makes it possible to change to the adjacent flow state in the diagonal direction in the Baker Chart. Doing so makes it possible to change the gas/liquid two-phase flow fluid that flows in the flow path quickly and accurately from the current flow state to a desired flow state.

A flow state controlling method according to the present invention is a flow state controlling method that uses a flow state controlling device to control, to a specified flow state, fluid of a gas/liquid two-phase flow that flows through a flow path, including: a pressure acquiring step wherein the flow state controlling device acquires pressure information relating to pressure of the fluid; a mass velocity acquiring step wherein the flow state controlling device acquires mass velocity information relating to the mass velocity of the fluid; a dryness fraction acquiring step wherein the flow state controlling device acquires dryness fraction information relating to the dryness fraction of the fluid; and a controlling step wherein the flow state controlling device controls, based on the pressure information, the mass velocity information, and the dryness fraction information, a pressure controlling device that is able to change a pressure of the fluid, a mass velocity controlling device that is able to change a mass velocity of the fluid, and a heat controlling device that is able to change the latent heat of the fluid.

Given this structure, the flow state controlling device controls the pressure controlling device, the mass velocity controlling device, and the heat controlling device based on mass velocity information, pressure information, and dryness fraction information. Knowing the pressure, mass velocity, and dryness fraction of the gas/liquid two-phase fluid makes it possible to identify the flow state of the fluid from a Baker Chart. Moreover, the flow state of the fluid can be changed by changing the pressure, mass velocity, and/or dryness fraction of the fluid. Consequently, the flow state controlling device can change the pressure, mass velocity, and/or the dryness fraction of the gas/liquid two-phase fluid that is flowing in the flow path by controlling the pressure controlling device, the mass velocity controlling device, and the heat controlling device based on the mass velocity information, the pressure information, and the dryness fraction information, thus making it possible to create a specific (arbitrary) flow state of the fluid.

Preferably the controlling step includes: a flow state detecting step wherein the flow state controlling device detects a flow state of the fluid at the current point in time based on the pressure information, the mass velocity information, and the dryness fraction information; and a drive controlling step wherein the flow state controlling device drives the pressure controlling device, the mass velocity controlling device, and/or the heat controlling device based on the flow state at the current point in time and on the specified flow state.

Given this structure, the flow state controlling device drives the pressure controlling device, the mass velocity controlling device, and/or the heat controlling device based on the flow state at that point in time and the desired flow state. Here, if, in the Baker Chart, the flow state at the current point in time and the specific flow state are known, then it is possible to determine which, of the pressure, mass velocity, or dryness fraction, of the gas/liquid two-phase flow fluid should be increased or reduced. This makes it possible to cause the gas/liquid two-phase flow fluid that is flowing in the flow path to go to a desired flow state even more easily through the flow state controlling device driving the pressure controlling device, the mass velocity controlling device, and/or the heat controlling device based on the flow state at the current point in time and the desired flow state.

Preferably the drive controlling step includes a step wherein the flow state controlling device performs control so as to change the mass velocity of the fluid without changing the pressure or the dryness fraction of the fluid.

Given this structure, the flow state controlling device performs control so as to change the mass velocity of the gas/liquid two-phase flow fluid that flows in the flow path without changing the pressure or dryness fraction of the gas/liquid two-phase flow fluid that flows in the flow path. This makes it possible to change to the adjacent flow state in the vertical direction (the vertical axis direction) in the Baker Chart. Doing so makes it possible to change the gas/liquid two-phase flow fluid that flows in the flow path quickly and accurately from the current flow state to a desired flow state.

Preferably the drive controlling step includes a step wherein the flow state controlling device performs control so as to change the dryness fraction of the fluid without changing the pressure or the mass velocity of the fluid.

Given this structure, the flow state controlling device performs control so as to change the dryness fraction of the gas/liquid two-phase flow fluid that flows in the flow path without changing the pressure or mass velocity of the gas/liquid two-phase flow fluid that flows in the flow path. This makes it possible to change to the adjacent flow state in the horizontal direction (the horizontal axis direction) in the Baker Chart. Doing so makes it possible to change the gas/liquid two-phase flow fluid that flows in the flow path quickly and accurately from the current flow state to a desired flow state.

Preferably the drive controlling step includes a step wherein the flow state controlling device performs control so as to change the pressure and the dryness fraction of the fluid without changing the mass velocity of the fluid.

Given this structure, the flow state controlling device performs control so as to change the pressure and the dryness fraction of the gas/liquid two-phase flow fluid that flows in the flow path without changing the mass velocity of the gas/liquid two-phase flow fluid that flows in the flow path. This makes it possible to change to the adjacent flow state in the horizontal direction (the horizontal axis direction), along with changing the region of each flow pattern, in the Baker Chart. Doing so makes it possible to change the gas/liquid two-phase flow fluid that flows in the flow path quickly and accurately from the current flow state to a desired flow state.

Preferably the drive controlling step includes a step wherein the flow state controlling device performs control so as to change the mass velocity and the dryness fraction of the fluid without changing the pressure of the fluid.

Given this structure, the flow state controlling device performs control so as to change the mass velocity and the dryness fraction of the gas/liquid two-phase flow fluid that flows in the flow path without changing the pressure of the gas/liquid two-phase flow fluid that flows in the flow path. This makes it possible to change to the adjacent flow state in the diagonal direction in the Baker Chart. Doing so makes it possible to change the gas/liquid two-phase flow fluid that flows in the flow path quickly and accurately from the current flow state to a desired flow state.

Given the flow state controlling device according to the present invention, the controlling portion can change the pressure, mass velocity, and/or the dryness fraction of the gas/liquid two-phase fluid that is flowing in the flow path by controlling the pressure controlling device, the mass velocity controlling device, and the heat controlling device based on the mass velocity information, the pressure information, and the dryness fraction information, thus making it possible to create a specific (arbitrary) flow state of the fluid. This makes it easy to place the gas/liquid two-phase flow fluid into the desired flow state. Moreover, this makes it possible to prevent the occurrence of drying-out by preventing the pipe from becoming dry, through maintaining the flow state of the fluid in a circulating flow in a state wherein the inner walls of the pipe are appropriately wet.

Given the flow state controlling method according to the present invention, the flow state controlling device can change the pressure, mass velocity, and/or the dryness fraction of the gas/liquid two-phase fluid that is flowing in the flow path by controlling the pressure controlling device, the mass velocity controlling device, and the heat controlling device based on the mass velocity information, the pressure information, and the dryness fraction information, thus making it possible to create a specific (arbitrary) flow state of the fluid. This makes it easy to place the gas/liquid two-phase flow fluid into the desired flow state. Moreover, this makes it possible to prevent the occurrence of drying-out by preventing the pipe from becoming dry, through maintaining the flow state of the fluid in a circulating flow in a state wherein the inner walls of the pipe are appropriately wet.

BRIEF DESCRIPTIONS OF THE DRAWINGS

DETAILED DESCRIPTION

Examples of the present invention will be described below. In the descriptions of the drawings below, identical or similar components are indicated by identical or similar codes. Note that the diagrams are schematic. Consequently, specific measurements should be evaluated in light of the descriptions below. Furthermore, even within these drawings there may, of course, be portions having differing dimensional relationships and proportions. Moreover, in the explanations below the top of the figure shall be defined as "up," the bottom of the figure shall be defined as "down," the left side of the figure shall be defined as "left," and the right side of the figure shall be defined as "right."

Figure 1:
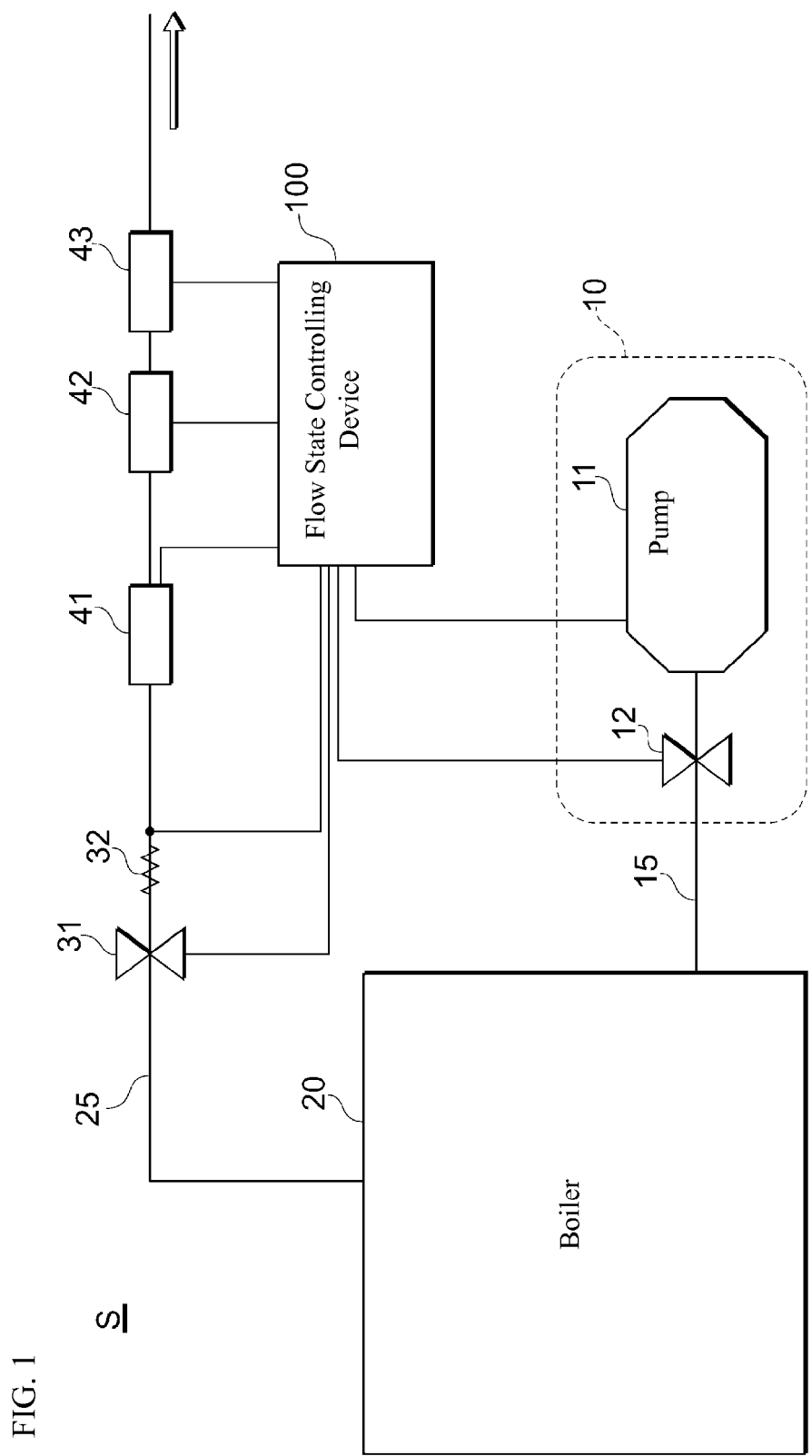
FIG. 1 is a schematic diagram for explaining an example of a fluid supplying system.

FIG. 1 to FIG. 9 illustrate an example of a flow state controlling device and flow state controlling method according to the present invention. FIG. 1 is a schematic diagram for explaining an example of a fluid supplying system S. As illustrated in FIG. 1, the fluid supplying system S is for supplying a gas/liquid two-phase flow fluid (hereinafter termed simply a "two-phase fluid"), which is a mixture of a liquid and a gas, for example, water vapor, to a device that is connected downstream from the fluid supplying system S, such as, for example, a heat exchanging device (not shown). The fluid supplying system S includes a water supplying device 10, a boiler 20, a pressure regulating valve 31, a heating device 32, a mass flow meter 41, a pressure sensor 42, a dryness fraction sensor 43, and a flow state controlling device 100.

The water supplying device 10 is for supplying water through a water supplying pipe 15. The water supplying device 10 is provided with a pump 11 and a throttling valve 12. The pump 11 applies pressure through, for example, mechanical energy to feed water at a specific pressure to the water supplying pipe 15. The throttling valve 12 is provided in a water supplying pipe 15, where the flow rate (mass flow rate) of the water that flows through the water supplying pipe 15 is regulated in accordance with the degree of opening of the valve. Here the mass flow rate of the fluid is the product of the mass velocity of the fluid per unit time times the cross-sectional area of the flow path (the pipe). Consequently, the throttling valve 12 essentially regulates the mass velocity of the water that flows through the water supplying pipe 15.

The pump 11 and the throttling valve 12 operate based on controlling signals (electrical signals) inputted from the flow state controlling device 100, described in detail below. Note that the pump 11 and the throttling valve 12 in the present example correspond to one example of a "mass velocity controlling device" in the present invention.

The boiler 20 is for supplying the two-phase fluid (the water vapor) through a supplying pipe 25. The boiler 20 applies, to the water that is supplied from the water supplying pipe 15, heat that is acquired through combustion of a fuel, such as natural gas, or the like, to produce the two-phase fluid (the water vapor), where the two-phase fluid (the water vapor) that is produced is expelled from the supplying pipe 25.

One end of the supplying pipe 25 (the left end in FIG. 1) is connected to the boiler 20, and the other end of the supplying pipe 25 (the right end in FIG. 1) is connected to a supply destination. The two-phase fluid that is expelled from the boiler 20 flows in the direction indicated by the arrow in FIG. 1 through the supplying pipe 25. A pressure regulating valve 31, a heating device 32, a mass flow meter 41, a pressure sensor 42, and a dryness fraction sensor 43 are installed between the one end and the other end of the supplying pipe 25.

The pressure regulating valve 31 regulates the two-phase fluid that is expelled from the boiler 20 and that flows through the supplying pipe 25 through, for example, pressure reduction, so that the pressure of the two-phase fluid will go to a specific value. The pressure regulating valve 31 operates based on a controlling signal (electric signal) inputted from the flow state controlling device 100. Note that the pressure regulating valve 31 in the present example corresponds to one example of a "pressure controlling device" in the present invention.

While, in the present example, an example wherein a pressure regulating valve 31 for reducing the pressure of the two-phase fluid is presented as an example of a "pressure controlling device," there is no limitation thereto. For example, a pressure pump may be provided in the supplying pipe 25 instead of the pressure regulating valve 31 or in addition to the pressure regulating valve 31. In such a case, it is possible to increase the pressure of the two-phase fluid that flows through the supplying pipe 25.

The heating device 32 is a heater that produces heat through, for example, electrical energy. The heating device 32 heats the two-phase fluid that flows through the supplying pipe 25 to change the latent heat (the calorific value) in the two-phase fluid. The heating device 32 operates based on a controlling signal (electric signal) inputted from the flow state controlling device 100. Note that the heating device in the present example corresponds to one example of a "heat controlling device" in the present invention.

While in the present invention an example wherein a heating device 32 for increasing the latent heat (the calorific value) of the two-phase fluid is presented as an example of a "heat controlling device," there is no limitation thereto. For example, a cooling device may be installed in the supplying pipe 25 instead of the heating device 32 or in addition to the heating device 32. In such a case, it is possible to decrease the latent heat (the calorific value) of the two-phase fluid that flows through the supplying pipe 25.

The mass flow meter 41 detects the mass velocity of the two-phase fluid that flows through the supplying pipe 25. The mass flow meter 41 outputs, to the flow state controlling device 100, a detection signal (an electric signal) that depends on the mass velocity that is detected. Note that the mass flow meter 41 may output a detection signal (an electric signal) that depends on the mass flow rate of the two-phase fluid instead of the mass velocity of the two-phase fluid or in addition to the mass velocity of the two-phase fluid.

While in the present example an example of the provision of a mass flow meter 41 is presented, there is no limitation thereto. For example, a flow sensor, for detecting the mass velocity, may be provided instead of the mass flow meter 41.

The pressure sensor 42 detects the pressure of the two-phase fluid that flows in the supplying pipe 25. The pressure sensor 42 outputs, to the flow state controlling device 100, a detection signal (an electric signal) that depends on the detected pressure.

The dryness fraction sensor 43 detects the dryness fraction (the quality) of the two-phase fluid that flows through the supplying pipe 25. The dryness fraction sensor 43 outputs, to the flow state controlling device 100, a detection signal (an electric signal) that depends on the dryness fraction that has been detected.

Typically, the dryness fraction (the quality) of a two-phase fluid indicates the mixture ratio of the saturated liquid and the saturated water vapor in the wet vapor. For example, if the saturated vapor included in 1 kg is x kilograms ($0 \leq x \leq 1$), then the dryness factor would be expressed as x.

The dryness factor in a two-phase fluid will change when, for example, the amount of heating (the heating state) of the heating device 32 is changed to change the latent heat of the two-phase fluid in a state wherein the pressure and the mass velocity of the two-phase fluid are held constant (are not changed). Moreover, the dryness factor of the two-phase fluid is changed also in the case wherein, f pressure or example, the pressure of the two-phase fluid is changed in a state wherein the amount of heating of the heating device 32 and the mass velocity of the two-phase fluid are held constant (are not changed).

The flow state controlling device 100 is for placing the flow state of water vapor (a two-phase fluid) that flows through the supplying pipe 25 into a specific flow state. The flow state controlling device 100 is connected to the pump 11 and the throttling valve 12 of the water supplying device 10, the pressure regulating valve 31, the heating device 32, the mass flow meter 41, the pressure sensor 42, and the dryness fraction sensor 43.

Figure 2:
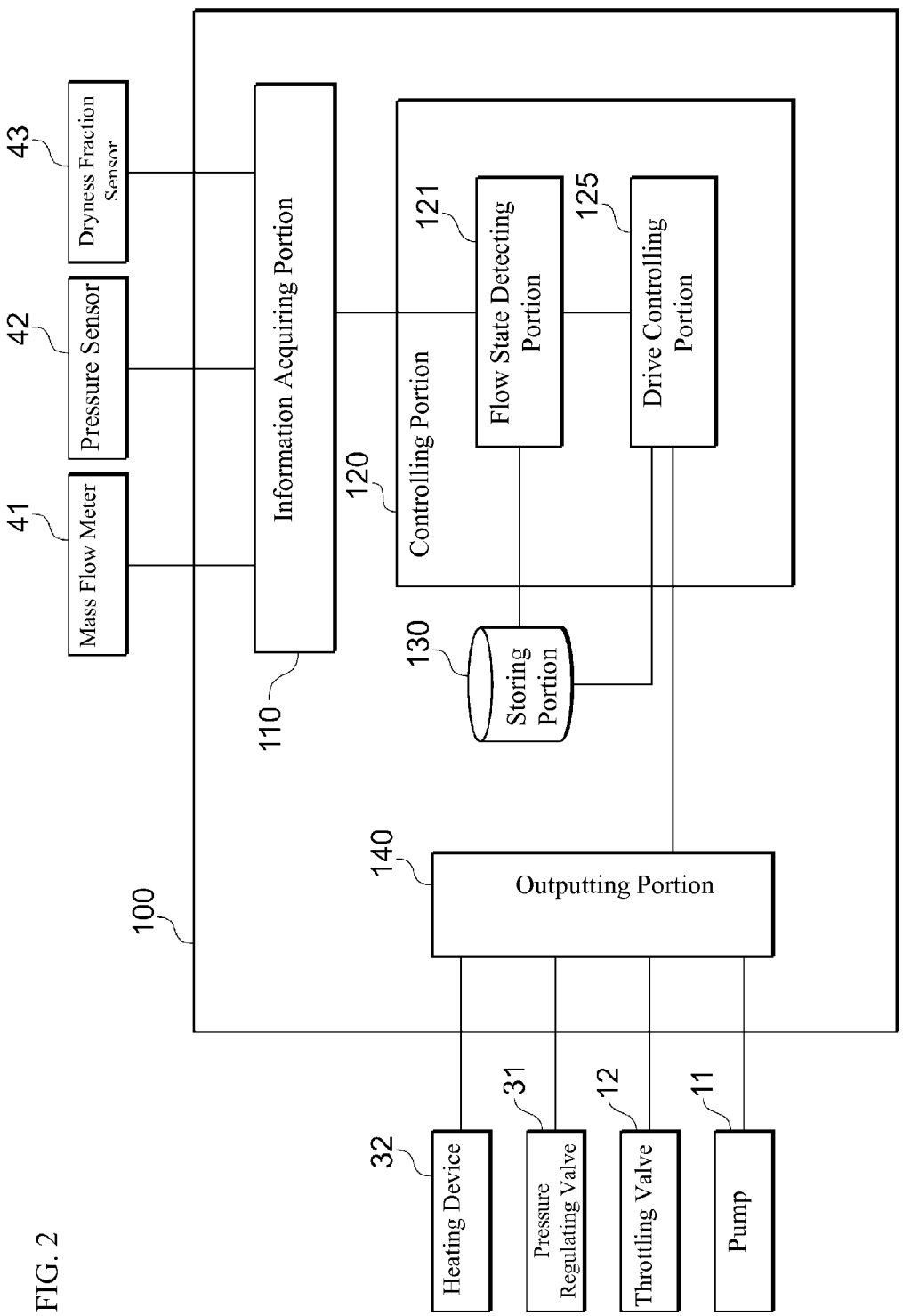
FIG. 2 is a block diagram for explaining the functional structure of the flow state controlling device illustrated in FIG. 1.

FIG. 2 is a block diagram for explaining the functional structure of the flow state controlling device 100 illustrated in FIG. 1. As illustrated in FIG. 2, the flow state controlling device 100 is provided with an information acquiring portion 110, a controlling portion 120, a storing portion 130, and an outputting portion 140.

The information acquiring portion 110 is connected to the mass flow meter 41, the pressure sensor 42, and the dryness fraction sensor 43. The information acquiring portion 110 inputs the detection signal for the mass velocity from the mass flow meter 41, inputs the detection signal for the pressure from the pressure sensor 42, and inputs the detection signal for the dryness fraction from the dryness fraction sensor 43. Mass velocity information regarding the mass velocity of the two-phase fluid, pressure information regarding the pressure of the two-phase fluid, and dryness fraction information regarding the dryness fraction of the two-phase fluid are acquired by the information acquiring portion 110 thereby.

While, in the present example, an example is presented wherein the information acquiring portion 110 acquires three types of information, specifically the mass velocity information, the pressure information, and the dryness fraction information, there is no limitation thereto. For example, the flow state controlling device 100 may include a mass velocity information acquiring portion, a pressure information acquiring portion, and a dryness fraction information acquiring portion, which may acquire, respectively, mass velocity information, pressure information, and dryness fraction information.

The information acquiring portion 110 includes an A/D converting device (not shown), to convert into detection data the various detection signals (electric signals) that have been inputted. The information acquiring portion 110 is connected to the controlling portion 120, and outputs, to the controlling portion 120, the various detection data that have been converted.

The controlling portion 120 is structured from, for example, a CPU, or the like, and is connected to the information acquiring portion 110. The controlling portion 120 controls the pump 11 and the throttling valve 12 of the water supplying device 10, and the pressure regulating valve 31 and the heating device 32, based on the mass velocity information, the pressure information, and the dryness fraction information acquired by the information acquiring portion 110.

Figure 3:
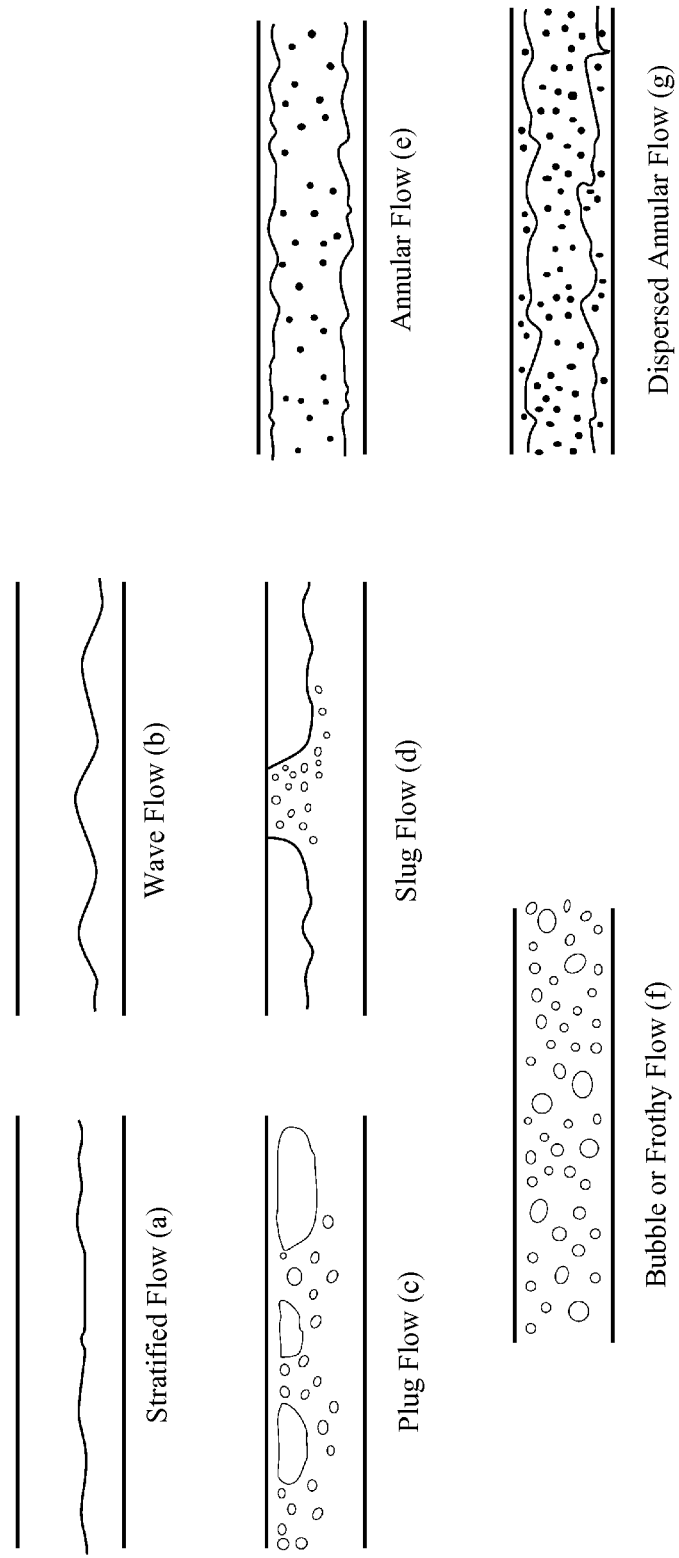
FIG. 3 is a diagram for explaining an example of a flow pattern of a two-phase fluid.

FIG. 3 is a diagram for explaining an example of a flow pattern of a two-phase fluid. Here the flow state of the two-phase fluid that flows through the supplying pipe 25, as illustrated in FIG. 3, can be categorized into seven different flow patterns: stratified flow (a), wave flow (b), plug flow (c), slug flow (d), annular flow (e), bubbly or frothy flow (f), and dispersed annular flow (g).

Figure 4:
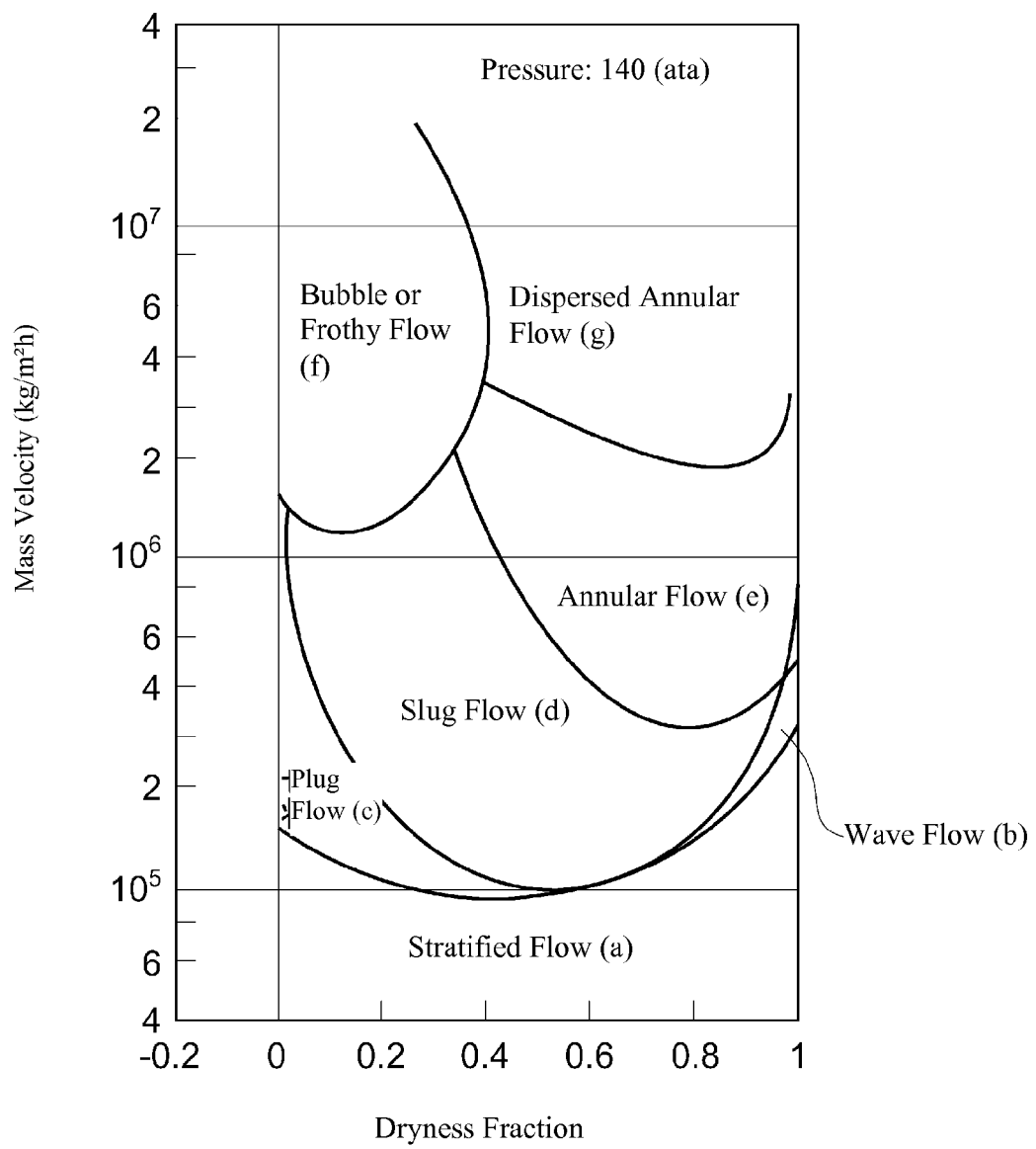
FIG. 4 is a diagram illustrating an example of a flow state of a two-phase fluid.

FIG. 4 is a diagram illustrating an example of a flow state of a two-phase fluid. Note that the diagram illustrated in FIG. 4 is a Baker Chart for the case of a two-phase fluid with a pressure of 140 (ata) (absolute pressure). As illustrated in FIG. 4, when the pressure, mass velocity, and dryness fraction of a two-phase fluid are known, the flow state of the two-phase fluid can be identified using the Baker Chart. Moreover, the flow state of the two-phase fluid can be changed by changing the pressure, mass velocity, and/or dryness fraction of the two-phase fluid. For example, if, for a two-phase fluid in stratified flow (a) the mass velocity is increased, then the flow state will change to wave flow (b), and then plug flow (c), and then slug flow (d). As a result, the controlling portion 120 can control the pump 11 and the throttling valve 12 of the water supplying device 10, and the pressure regulating valve 31 and the heating device 32 based on the mass velocity information, the pressure information, and the dryness fraction information to change the pressure, mass velocity, and/or dryness fraction of the two-phase fluid that flows in the supplying pipe 25, making it possible to set the two-phase fluid to a specific (arbitrary) flow state.

In the present invention, the explanation will be for the controlling portion 120 performing control so that the two-phase fluid that flows in the supplying pipe 25 will go to (or be maintained in) an annular flow (e), as the specific flow state.

As illustrated in FIG. 2, the controlling portion 120 is structured including a flow state detecting portion 121 and a drive controlling portion 125.

The flow state detecting portion 121 is connected to the information acquiring portion 110, and inputs, from the information acquiring portion 110, mass velocity data, pressure data, and dryness fraction data. Furthermore, the flow state detecting portion 121 is connected so as to be able to access (that is, read from and write to) the storing portion 130. The flow state detecting portion 121 writes, to the storing portion 130, the mass velocity data, the pressure data, and the dryness fraction data that have been inputted from the information acquiring portion 110.

The storing portion 130 stores, in advance, data relating to Baker Charts for various different pressures. The flow state detecting portion 121 reads out data regarding a Baker Chart from the storing portion 130 based on the pressure data that is inputted from the information acquiring portion 110. Given this, the flow state detecting portion 121 detects the flow state of the two-phase fluid that is flowing in the supplying pipe 25 at the current point in time based on the mass velocity data and the dryness fraction data inputted from the information acquiring portion 110 by drawing a Baker Chart based on the data relating to Baker Charts read out from the storing portion 130.

The drive controlling portion 125 is connected to the flow state detecting portion 121, and inputs the flow state for the current point in time from the flow state detecting portion 121. Moreover, the drive controlling portion 125 is also connected so as to be able to access (that is, to read from or write to) the storing portion 130 in the same manner as with the flow state detecting portion 121. The drive controlling portion 125 accesses the storing portion 130 in order to generate and output control data for the pump 11 and the throttling valve 12, the pressure regulating valve 31, and/or the heating device 32 based on the flow state at the current point in time, inputted from the flow state detecting portion 121, and a specified flow state, that is, the annular flow (e).

Here, in the Baker Chart illustrated in FIG. 4, when the flow state at the current point in time and the specified flow state are known, then it is possible to determine which, of the pressure, mass velocity, and dryness fraction of the two-phase fluid, should be increased or decreased. For example, if the flow state at the current point in time is the dispersed annular flow (g), the mass velocity of the annular flow (e), which is the target, is lower, and thus the drive controlling portion 125 outputs control data so as to control the pump 11 and the throttling valve 12 so as to reduce the mass velocity of the two-phase fluid that flows in the supplying pipe 25. Thus the drive controlling portion 125 is able to cause the two-phase fluid that flows in the supplying pipe 25 to enter a desired flow state more easily through driving the pump 11 and the throttling valve 12, the pressure regulating valve 31, and/or the heating device 32 based on the flow state at the current point in time and a specified flow state.

The outputting portion 140 is connected to the drive controlling portion 125, and inputs control data from the drive controlling portion 125. The outputting portion 140 includes a D/A converting device (not shown), to convert the inputted the control data into controlling signals (electric signals). Moreover, the outputting portion 140 is connected to the pump 11 and the throttling valve 12 of the water supplying device 10, the pressure regulating valve 31, and the heating device 32. The outputting portion 140 outputs the converted controlling signals (the electric signals) to the pump 11 and the throttling valve 12, and the pressure regulating valve 31 and heating device 32.

In the present example an example was presented wherein the drive controlling portion 125 controls both the pump 11 and the throttling valve 12 of the water supplying device 10, but there is no limitation thereto. For example, the configuration may be such that the drive controlling portion 125 controls either the pump 11 or the throttling valve 12, but not both.

The operation of the flow state controlling device 100 for causing the flow state of the two-phase fluid that flows in the supplying pipe 25 to go to annular flow (e) will be explained next.

Figure 5:
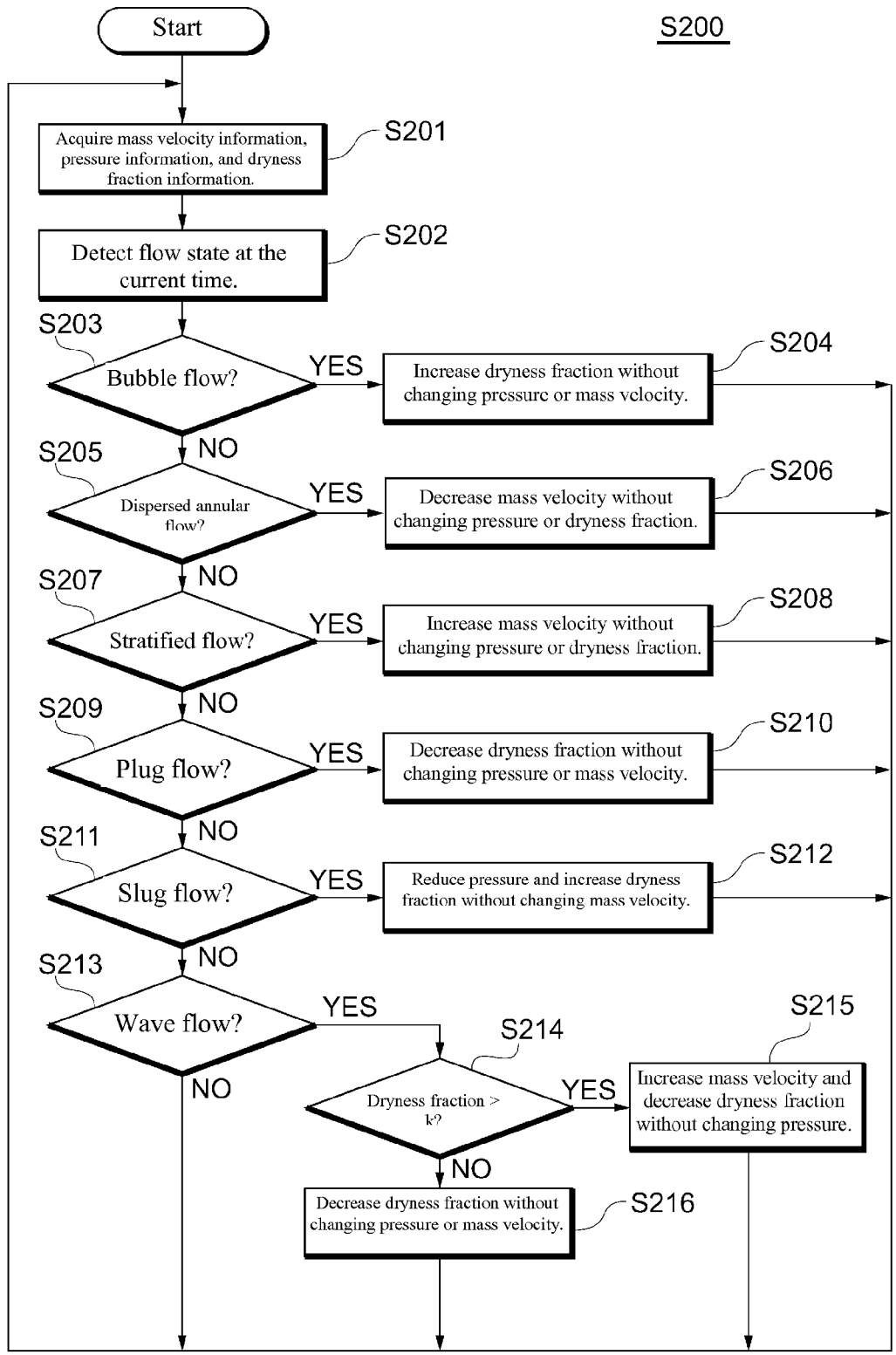
FIG. 5 is a flowchart for explaining the operation of the flow state controlling device illustrated in FIG. 1.

FIG. 5 is a flowchart for explaining the operation of the flow state controlling device 100 illustrated in FIG. 1. As illustrated in FIG. 5, the flow state controlling device 100 executes a process S200. That is, first the information acquiring portion 110 acquires mass velocity information, pressure information, and dryness fraction information (S201).

Following this, the flow state detecting portion 121 detects the flow state at the current point in time for the two-phase fluid that flows in the supplying pipe 25 based on the mass velocity data, the pressure data, and the dryness fraction data (S202).

Following this, the drive controlling portion 125, based on the flow state detected by the flow state detecting portion 121, evaluates whether or not the flow state at the current point in time is bubble or frothy flow (S203).

If the result of the evaluation in S203 is that the flow state at the current point in time is bubble or frothy flow, then the drive controlling portion 125 controls the output of the controlling signal through the outputting portion 140 to the heating device 32 so as to increase, through heating, the latent heat in the two-phase fluid that is flowing in the supplying pipe 25. At this time, the drive controlling portion 125 controls the pressure regulating valve 31 and the pump 11 and throttling valve 12 so that there is no change in the pressure or the mass velocity of the two-phase fluid that is flowing in the supplying pipe 25. As a result, the drive controlling portion 125 increases the dryness fraction of the two-phase fluid that is flowing in the supplying pipe 25, without changing the pressure or the mass velocity thereof (S204).

Figure 6:
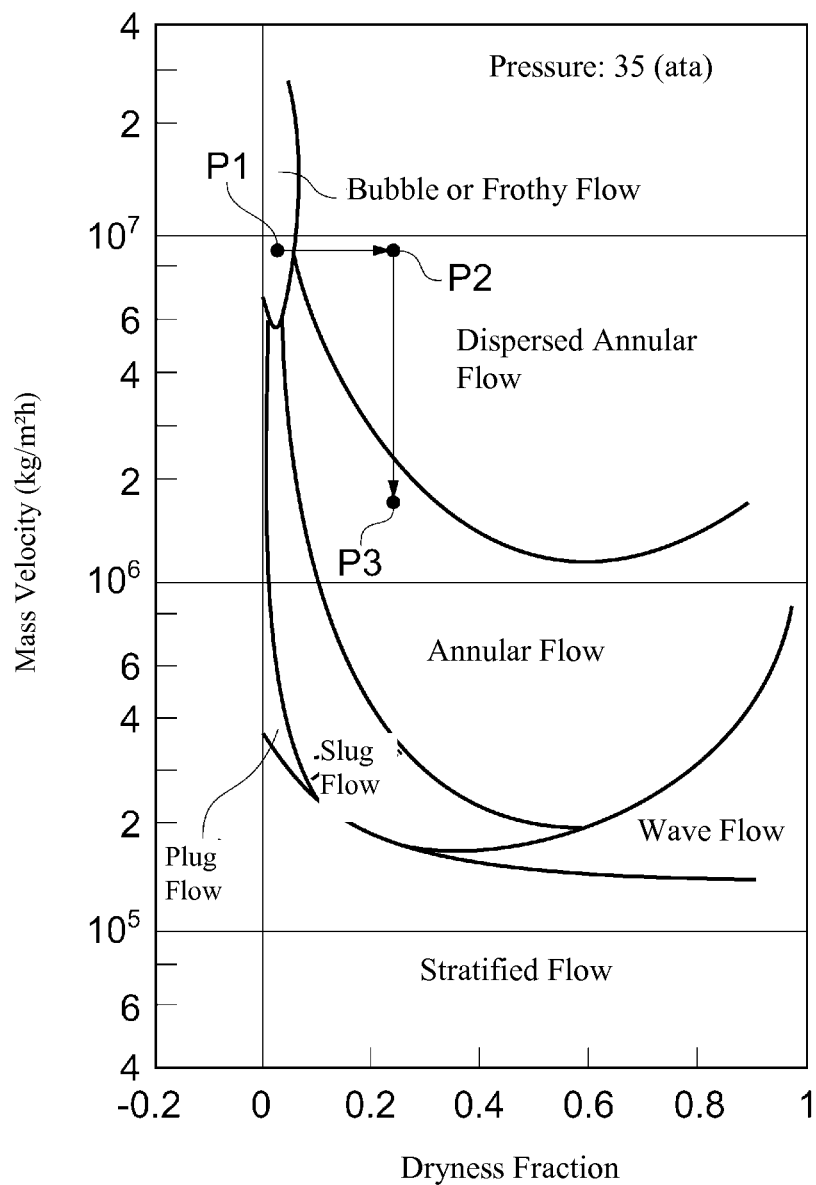
FIG. 6 is a diagram illustrating an example of a change in a flow state of a two-phase fluid.

FIG. 6 is a diagram illustrating an example of a change in a flow state of a two-phase fluid. Note that the diagram illustrated in FIG. 6 is a Baker Chart for the case of a two-phase fluid with a pressure of 35 (ata) (absolute pressure). As illustrated in FIG. 6, when the flow state at the current point in time is, for example, P1, and, in Step S204, the dryness fraction is increased without changing the pressure or the mass velocity, then, as indicated by the arrow, the state changes from State P1, which is the bubble or frothy flow, to State P2, which is the dispersed annular flow. In this way, as illustrated in FIG. 6, the flow state can be changed to the adjacent flow state in the horizontal direction (in the direction of the horizontal axis) in the Baker Chart through the drive controlling portion 125 performing control so as to change the dryness fraction of the two-phase fluid that flows in the supplying pipe 25 without changing the pressure or the mass velocity of the two-phase fluid that flows in the supplying pipe 25.

After the completion of Step S204, the flow state controlling device 100 repeats the steps starting with S201.

On the other hand, if the result of the evaluation in S203 is that the flow state at the current point in time is not bubble or frothy flow, then the drive controlling portion 125 evaluates, based on the flow state detected by the flow state detecting portion 121 in S202, whether or not the flow state at the current point in time is the dispersed annular flow state (S205).

If the result of the evaluation in S205 is that the flow state at the current point in time is dispersed annular flow, then the drive controlling portion 125 controls the output of the controlling signal through the outputting portion 140 to the pump 11 and the throttling valve 12 so as to decrease the mass velocity of the two-phase fluid that is flowing in the supplying pipe 25. At this time, the drive controlling portion 125 performs control so as to output a controlling signal to the heating device 32, through the outputting portion 140, so as to maintain, at a constant level, the latent heat of the two-phase fluid that flows through the supplying pipe 25, through decreasing the amount of heating in response to the decrease in the mass velocity. Moreover, the drive controlling portion 125 controls the pressure regulating valve 31 so that there will be no change in pressure in the two-phase fluid that is flowing through the supplying pipe 25. As a result, the drive controlling portion 125 decreases the mass velocity of the two-phase fluid that is flowing in the supplying pipe 25, without changing the pressure or the dryness fraction thereof (S206).

As illustrated in FIG. 6, when the flow state at the current point in time is, for example, P2, and, in Step S206, the mass velocity is decreased without changing the pressure or the dryness fraction, then, as indicated by the arrow, the state changes from State P2, which is the dispersed annular flow, to State P3, which is the annular flow. In this way, as illustrated in FIG. 6, the flow state can be changed to the adjacent flow state in the vertical direction (in the direction of the vertical axis) in the Baker Chart through the drive controlling portion 125 performing control so as to change the mass velocity of the two-phase fluid that flows in the supplying pipe 25 without changing the pressure or the dryness fraction of the two-phase fluid that flows in the supplying pipe 25.

After the completion of Step S206, the flow state controlling device 100 repeats the steps starting with S201.

On the other hand, if the result of the evaluation in S205 is that the flow state at the current point in time is not dispersed annular flow, then the drive controlling portion 125 evaluates, based on the flow state detected by the flow state detecting portion 121 in S202, whether or not the flow state at the current point in time is the stratified flow state (S207).

If the result of the evaluation in S207 is that the flow state at the current point in time is stratified flow, then the drive controlling portion 125 controls the output of the controlling signal through the outputting portion 140 to the pump 11 and the throttling valve 12 so as to increase the mass velocity of the two-phase fluid that is flowing in the supplying pipe 25. At this time, the drive controlling portion 125 performs control so as to output a controlling signal to the heating device 32, through the outputting portion 140, so as to maintain, at a constant level, the latent heat of the two-phase fluid that flows through the supplying pipe 25, through increasing the amount of heating in response to the increase in the mass velocity. Moreover, the drive controlling portion 125 controls the pressure regulating valve 31 so that there will be no change in pressure in the two-phase fluid that is flowing through the supplying pipe 25. As a result, the drive controlling portion 125 increases the mass velocity of the two-phase fluid that is flowing in the supplying pipe 25, without changing the pressure or the dryness fraction thereof (S208).

Figure 7:
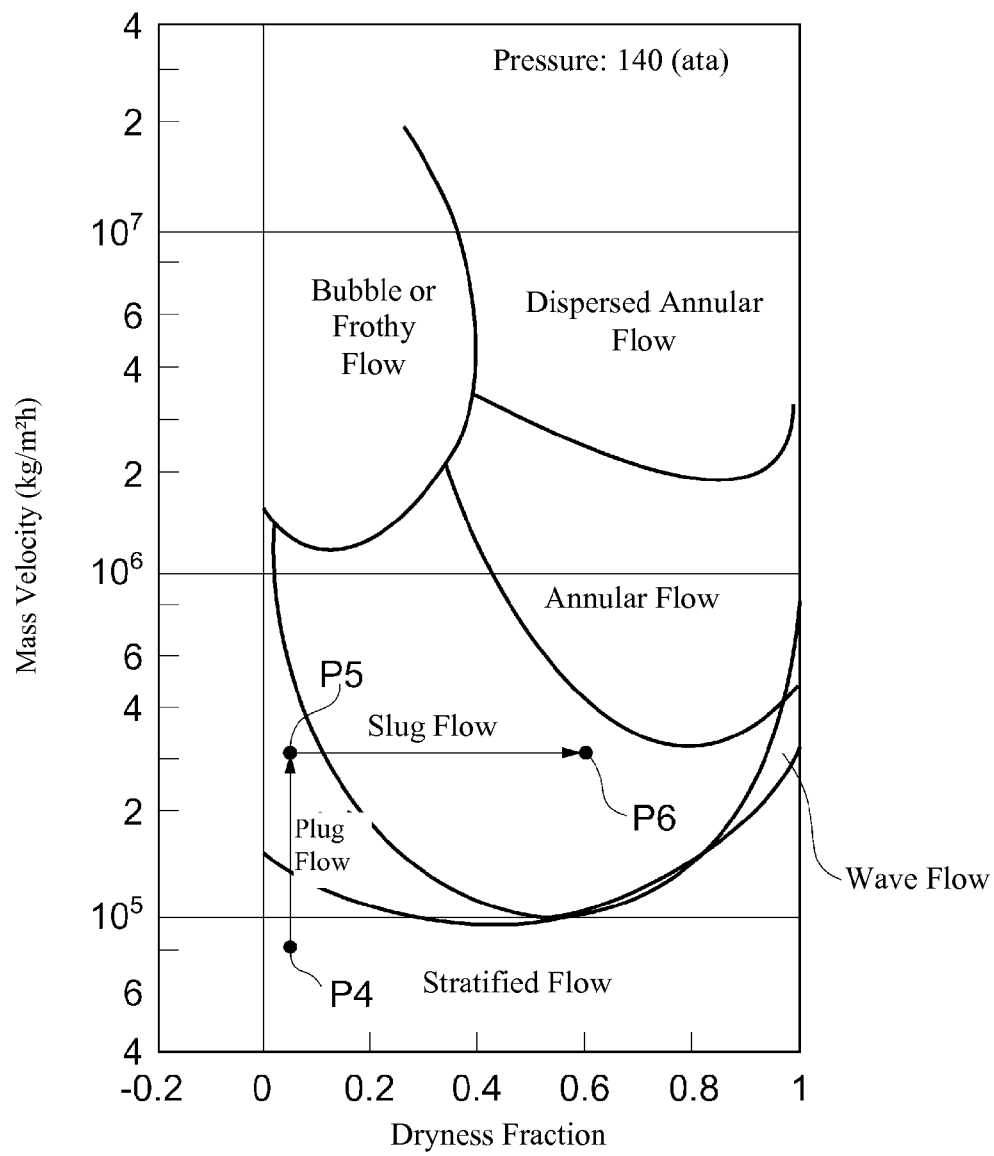
FIG. 7 is a diagram illustrating another example of a change in a flow state of a two-phase fluid.

FIG. 7 is a diagram illustrating another example of a change in a flow state of a two-phase fluid. Note that the diagram illustrated in FIG. 7 is a Baker Chart for the case of a two-phase fluid with a pressure of 140 (ata) (absolute pressure). As illustrated in FIG. 7, when the flow state at the current point in time is, for example, P4, and, in Step S208, the mass velocity of the two-phase fluid that flows in the supplying pipe 25 is increased without changing the pressure or the dryness fraction, then, as indicated by the arrow, the state changes from State P4, which is the stratified flow, to State P5, which is the plug flow. In this way, as illustrated in FIG. 7, the flow state can be changed to the adjacent flow state in the vertical direction (in the direction of the vertical axis) in the Baker Chart through the drive controlling portion 125 performing control so as to change the mass velocity of the two-phase fluid that flows in the supplying pipe 25 without changing the pressure or the dryness fraction of the two-phase fluid that flows in the supplying pipe 25.

After the completion of Step S208, the flow state controlling device 100 repeats the steps starting with S201.

On the other hand, if the result of the evaluation in S207 is that the flow state at the current point in time is not stratified flow, then the drive controlling portion 125 evaluates, based on the flow state detected by the flow state detecting portion 121 in S202, whether or not the flow state at the current point in time is the plug flow state (S209).

If the result of the evaluation in S209 is that the flow state at the current point in time is plug flow, then the drive controlling portion 125 controls the output of the controlling signal through the outputting portion 140 to the heating device 32 so as to increase, through heating, the latent heat in the two-phase fluid that is flowing in the supplying pipe 25. At this time, the drive controlling portion 125 controls the pressure regulating valve 31 and the pump 11 and throttling valve 12 so that there is no change in the pressure or the mass velocity of the two-phase fluid that is flowing in the supplying pipe 25. As a result, the drive controlling portion 125 increases the dryness fraction of the two-phase fluid that is flowing in the supplying pipe 25, without changing the pressure or the mass velocity thereof (S210).

As illustrated in FIG. 7, when the flow state at the current point in time is, for example, P5, and, in Step S210, the dryness fraction of the two-phase fluid that flows in the supplying pipe 25 is increased without changing the pressure or the mass velocity, then, as indicated by the arrow, the state changes from State P5, which is the plug flow, to State P6, which is the slug flow. In this way, as illustrated in FIG. 7, the flow state can be changed to the adjacent flow state in the horizontal direction (in the direction of the horizontal axis) in the Baker Chart through the drive controlling portion 125 performing control so as to change the dryness fraction of the two-phase fluid that flows in the supplying pipe 25 without changing the pressure or the mass velocity of the two-phase fluid that flows in the supplying pipe 25.

After the completion of Step S210, the flow state controlling device 100 repeats the steps starting with S201.

On the other hand, if the result of the evaluation in S209 is that the flow state at the current point in time is not plug flow, then the drive controlling portion 125 evaluates, based on the flow state detected by the flow state detecting portion 121 in S202, whether or not the flow state at the current point in time is the slug flow state (S211).

If the result of the evaluation in S211 is that the flow state at the current point in time is slug flow, then the drive controlling portion 125 controls the output of the controlling signal through the outputting portion 140 to the pressure regulating valve 31 so as to decrease the pressure of the two-phase fluid that is flowing in the supplying pipe 25. At this time, the dryness fraction of the two-phase fluid that is flowing through the supplying pipe 25 is increased through the decrease in pressure. Moreover, the drive controlling portion 125 controls the pump 11 and the throttling valve 12 so that there will be no change in the mass velocity of the two-phase fluid that is flowing through the supplying pipe 25. As a result, the drive controlling portion 125 decreases the pressure and increases the dryness fraction of the two-phase fluid that is flowing in the supplying pipe 25, without changing the mass velocity thereof (S212).

Figure 8:
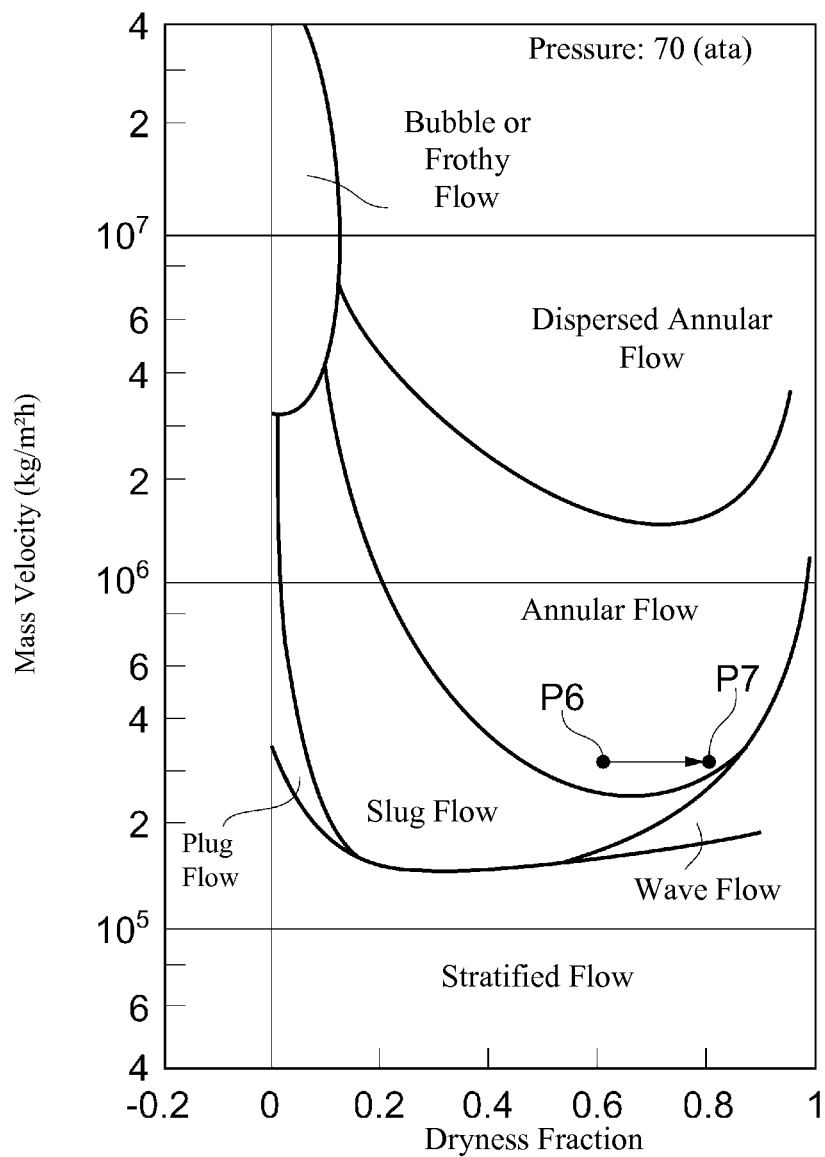
FIG. 8 is a diagram illustrating yet another example of a change in a flow state of a two-phase fluid.

FIG. 8 is a diagram illustrating yet another example of a change in a flow state of a two-phase fluid. Note that the diagram illustrated in FIG. 8 is a Baker Chart for the case of a two-phase fluid with a pressure of 70 (ata) (absolute pressure). As illustrated in FIG. 7 and FIG. 8, when the flow state at the current point in time is, for example, P6, and, in Step S212, the pressure of the two-phase fluid that flows in the supplying pipe 25 is decreased and the dryness fraction is increased without changing the mass velocity, then the Baker Chart changes from that in FIG. 7 to that FIG. 8, and along with the annular flow domain getting larger, the state changes from State P6, which is the slug flow, to State P7, which is the annular flow, as indicated by the arrow in FIG. 8. In this way, as illustrated in FIG. 7 and FIG. 8, along with changing in the Baker Chart, the various flow pattern domains, the flow state can be changed to the adjacent flow state in the horizontal direction (in the direction of the horizontal axis) through the drive controlling portion 125 performing control so as to change the pressure and the dryness fraction of the two-phase fluid that flows in the supplying pipe 25 without changing the mass velocity of the two-phase fluid that flows in the supplying pipe 25.

After the completion of Step S210, the flow state controlling device 100 repeats the steps starting with S201.

On the other hand, if the result of the evaluation in S211 is that the flow state at the current point in time is not slug flow, then the drive controlling portion 125 evaluates, based on the flow state detected by the flow state detecting portion 121 in S202, whether or not the flow state at the current point in time is the wave flow state (S213).

If the result of the evaluation in S213 is that the flow state at the current point in time is wave flow, then the drive controlling portion 125 reads out the dryness fraction data from the storing portion 130 and evaluates whether or not the dryness fraction at the current point in time for the two-phase fluid that is flowing in the supplying pipe 25 is greater than a threshold value k (S214). The threshold value k is stored in advance in, for example, a memory (not shown) of the controlling portion 120, where, as one example, the threshold value k is set to 0.6 (k=0.6).

If the result of the evaluation in S214 is that the dryness fraction at the current point in time is greater than the threshold value k, then the drive controlling portion 125 controls the output of the controlling signal through the outputting portion 140 to the pump 11 and the throttling valve 12 so as to increase the mass velocity of the two-phase fluid that is flowing in the supplying pipe 25. Moreover, the drive controlling portion 125 controls the heating device 32 so as to maintain the amount of heating at a constant level. At this time, the dryness fraction of the two-phase fluid that is flowing through the supplying pipe 25 is decreased through increasing the mass velocity while holding the amount of heating of the heating device 32 constant. Moreover, the drive controlling portion 125 controls the pressure regulating valve 31 so that there will be no change in pressure in the two-phase fluid that is flowing through the supplying pipe 25. As a result, the drive controlling portion 125 increases the mass velocity of the two-phase fluid that is flowing in the supplying pipe 25, without changing the pressure thereof (S215).

On the other hand, if the result of the evaluation in S214 is that the dryness fraction at the current point in time is not greater than the threshold value k, that is, that the dryness fraction at the current point in time is less than or equal to the threshold value k, then the drive controlling portion 125 controls the output of the controlling signal through the outputting portion 140 to the pump 11 and the throttling valve 12 so as to increase the mass velocity of the two-phase fluid that is flowing in the supplying pipe 25. At this time, the drive controlling portion 125 controls the heating device 32, through the outputting portion 140, so as to maintain, at a constant level, the latent heat of the two-phase fluid that flows through the supplying pipe 25, through increasing the amount of heating in response to the increase in the mass velocity. Moreover, the drive controlling portion 125 controls the pressure regulating valve 31 so that there will be no change in pressure in the two-phase fluid that is flowing through the supplying pipe 25. As a result, the drive controlling portion 125 increases the mass velocity of the two-phase fluid that is flowing in the supplying pipe 25, without changing the pressure or the dryness fraction thereof (S216).

Figure 9:
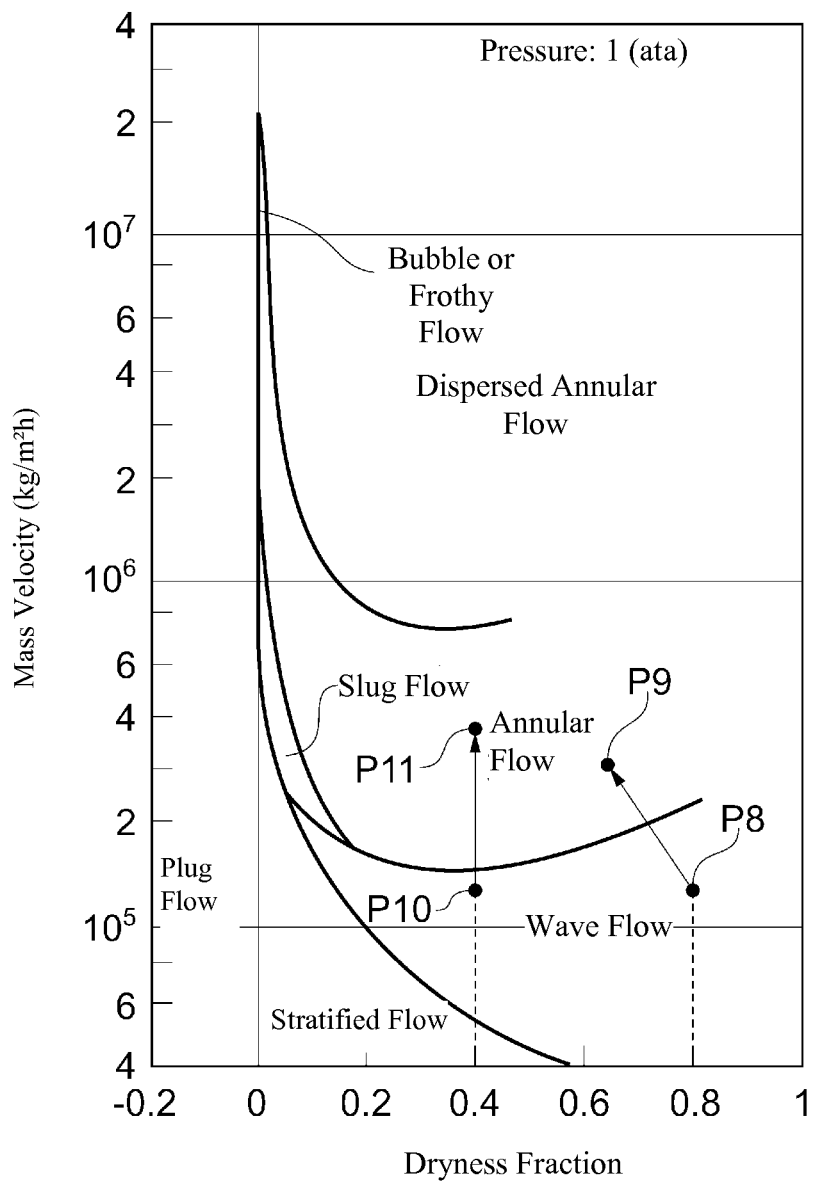
FIG. 9 is a diagram illustrating yet another example of a change in a flow state of a two-phase fluid.

FIG. 9 is a diagram illustrating yet another example of a change in a flow state of a two-phase fluid. Note that the diagram illustrated in FIG. 9 is a Baker Chart for the case of a two-phase fluid with a pressure of 1 (ata) (absolute pressure). As illustrated in FIG. 9, when the flow state at the current point in time is, for example, P8, with the dryness fraction at 0.8, and, in Step S215, the mass velocity of the two-phase fluid that flows in the supplying pipe 25 is increased and the dryness fraction is decreased without changing the pressure, then, as indicated by the arrow, the state changes from State P8, which is the wave flow, to State P9, which is the annular flow. In this way, as illustrated in FIG. 9, the flow state can be changed to the adjacent flow state in the diagonal direction in the Baker Chart through the drive controlling portion 125 performing control so as to change the mass velocity and the dryness fraction of the two-phase fluid that flows in the supplying pipe 25 without changing the pressure of the two-phase fluid that flows in the supplying pipe 25.

On the other hand, if the flow state at the current point in time is, for example, P10, with the dryness fraction at 0.4, and, in Step S216, the mass velocity of the two-phase fluid that flows in the supplying pipe 25 is increased without changing the pressure or the dryness fraction, then, as indicated by the arrow, the state changes from State P10, which is the wave flow, to State P11, which is the annular flow. In this way, as illustrated in FIG. 9, the flow state can be changed to the adjacent flow state in the vertical direction (in the direction of the vertical axis) in the Baker Chart through the drive controlling portion 125 performing control so as to change the mass velocity of the two-phase fluid that flows in the supplying pipe 25 without changing the pressure or the dryness fraction of the two-phase fluid that flows in the supplying pipe 25.

After the completion of Step S215 or Step S216, the flow state controlling device 100 repeats the steps starting with S201.

On the other hand, if the result of the evaluation in S213 is that the flow state at the current point in time is not wave flow, then, because the flow state at the current point in time is not bubble or frothy flow, dispersed annular flow, stratified flow, plug flow, slug flow, or wave flow, then it can be considered to be the remaining flow state, that of annular flow. In this case, the two-phase fluid that is flowing in the supplying pipe 25 is in the desired flow state, so there is no need to for the flow state controlling device 100 to change the flow state. Consequently, the flow state controlling device 100 repeats the steps from S201 forward, without the drive controlling portion 125 performing any control.

While the present example illustrated an example wherein the evaluations were performed sequentially for the bubble or frothy flow, the dispersed annular flow, the stratified flow, the plug flow, the slug flow, and the wave flow in S203, S205, S207, S209, S211, and S213, there is no limitation thereto, and the order of this sequence may be changed.

Moreover, while in the present example an example was presented wherein the flow state controlling device 100 produced annular flow as the specified flow state, there is no limitation thereto. For example, depending on the setup environment (the location of installation), the state of use, the device that is the supply destination, and so forth, a flow state other than annular flow may be produced.

In this way, in the flow state controlling device 100 and flow state controlling method according to the present invention, the controlling portion 120 controls the pump 11 and the throttling valve 12 of the water supplying device 10, along with the pressure regulating valve 31 and the heating device 32, based on the mass velocity information, the pressure information, and the dryness fraction information acquired by the information acquiring portion 110. Here, as illustrated in FIG. 4, if the pressure, mass velocity, and dryness fraction of a two-phase fluid are known, then the flow state of that two-phase fluid can be identified using a Baker Chart. Moreover, the flow state of the two-phase fluid can be changed by changing the pressure, mass velocity, and/or dryness fraction of the two-phase fluid. For example, if, for a two-phase fluid in stratified flow (a) the mass velocity is increased, then the flow state will change to wave flow (b), and then plug flow (c), and then slug flow (d). As a result, the controlling portion 120 can control the pump 11 and the throttling valve 12 of the water supplying device 10, and the pressure regulating valve 31 and the heating device 32 based on the mass velocity information, the pressure information, and the dryness fraction information to change the pressure, mass velocity, and/or dryness fraction of the two-phase fluid that flows in the supplying pipe 25, making it possible to set the two-phase fluid to a specific (arbitrary) flow state. This makes it easy to place the two-phase flow fluid into the desired flow state. Moreover, this makes it possible to maintain the flow state of the two-phase flow fluid in a circulating flow in a state wherein the inner walls of the supplying pipe 25 are in an appropriately wet state, making it possible to prevent the occurrence of dry-out by suppressing drying of the supplying pipe 25.

Moreover, in the flow state controlling device 100 and the flow state controlling method according to the present example, the pump 11 and throttling valve 12, the pressure regulating valve 31, and/or the heating device 32 are controlled, by the drive controlling portion 125, based on the flow state at the current point in time and a specified flow state. Here, in the Baker Chart illustrated in FIG. 4, when the flow state at the current point in time and the specified flow state are known, then it is possible to determine which, of the pressure, mass velocity, and dryness fraction of the two-phase fluid, should be increased or decreased. For example, if the flow state at the current point in time is the dispersed annular flow (g), the mass velocity of the annular flow (e), which is the target, is lower, and thus the drive controlling portion 125 outputs control data so as to control the pump 11 and the throttling valve 12 so as to reduce the mass velocity of the two-phase fluid that flows in the supplying pipe 25. Thus the drive controlling portion 125 is able to cause the two-phase fluid that flows in the supplying pipe 25 to enter a desired flow state more easily through driving the pump 11 and the throttling valve 12, the pressure regulating valve 31, and/or the heating device 32 based on the flow state at the current point in time and a specified flow state.

Moreover, given the flow state controlling device 100 and the flow student controlling method according to the present example, the drive controlling portion 125 performs control so as to change the mass velocity of the two-phase fluid that flows in the supplying pipe 25 without changing the pressure or dryness fraction of the two-phase fluid that flows in the supplying pipe 25. This makes it possible to change to the adjacent flow state in the vertical direction (the vertical axis direction) in the Baker Chart, as illustrated in FIG. 6, FIG. 7, and FIG. 9. Doing so makes it possible to change the two-phase fluid that flows in the supplying pipe 25 quickly and accurately from the current flow state to a desired flow state.

Moreover, given the flow state controlling device 100 and the flow student controlling method according to the present example, the drive controlling portion 125 performs control so as to change the dryness fraction of the two-phase fluid that flows in the supplying pipe 25 without changing the pressure or the mass velocity of the two-phase fluid that flows in the supplying pipe 25. This makes it possible to change to the adjacent flow state in the horizontal direction (the horizontal axis direction) in the Baker Chart, as illustrated in FIG. 6 and FIG. 7. Doing so makes it possible to change the two-phase fluid that flows in the supplying pipe 25 quickly and accurately from the current flow state to a desired flow state.

Moreover, given the flow state controlling device 100 and the flow student controlling method according to the present example, the drive controlling portion 125 performs control so as to change the pressure and the dryness fraction of the two-phase fluid that flows in the supplying pipe 25 without changing the mass velocity of the two-phase fluid that flows in the supplying pipe 25. This makes it possible to change to the adjacent flow state in the horizontal direction (the horizontal axis direction), along with changing the domains of the various flow patterns, in the Baker Chart, as illustrated in FIG. 7 and FIG. 8. Doing so makes it possible to change the two-phase fluid that flows in the supplying pipe 25 quickly and accurately from the current flow state to a desired flow state.

Moreover, given the flow state controlling device 100 and the flow student controlling method according to the present example, the drive controlling portion 125 performs control so as to change the mass velocity and the dryness fraction of the two-phase fluid that flows in the supplying pipe 25 without changing the pressure of the two-phase fluid that flows in the supplying pipe 25. This makes it possible to change to the adjacent flow state in the diagonal direction in the Baker Chart, as illustrated in FIG. 9. Doing so makes it possible to change the two-phase fluid that flows in the supplying pipe 25 quickly and accurately from the current flow state to a desired flow state.

Note that the structures in the present examples, set forth above, may be combined or partially replaced with other structures. Moreover, the structures in the present examples are not limited to those set forth above, but rather may be varied in a variety of ways in a scope that does not deviate from the spirit or intent of the present invention.

The present invention is applicable to technologies for controlling a flow state of a gas/liquid two-phase flow fluid.

The invention claimed is:

1. A flow state controlling device for controlling, to a specified flow state, fluid of a gas/liquid two-phase flow that flows through a flow path, the flow state controlling device comprising:
    a pressure acquiring portion that acquires pressure information relating to pressure of the fluid;
    a mass velocity acquiring portion that acquires mass velocity information relating to a mass velocity of the fluid;
    a dryness fraction acquiring portion that acquires dryness fraction information relating to the dryness fraction of the fluid; and
    a controlling portion that controls, based on the pressure information, the mass velocity information, and the dryness fraction information, a pressure controlling device that is able to change a pressure of the fluid, a mass velocity controlling device that is able to change a mass velocity of the fluid, and a heat controlling device that is able to change the latent heat of the fluid.

2. The flow state controlling device as set forth in claim 1, wherein:
    the controlling portion includes:
    a flow state detecting portion that detects a flow state of the fluid at the current point in time based on the pressure information, the mass velocity information, and the dryness fraction information; and
    a drive controlling portion that drives the pressure controlling device, the mass velocity controlling device, and/or the heat controlling device based on the flow state at the current point in time and on the specified flow state.

3. The flow state controlling device as set forth in claim 2, wherein:
    the drive controlling portion performs control so as to change the mass velocity of the fluid without changing the pressure or the dryness fraction of the fluid.

4. The flow state controlling device as set forth in claim 2, wherein:
    the drive controlling portion performs control so as to change the dryness fraction of the fluid without changing the pressure or the mass velocity of the fluid.

5. The flow state controlling device as set forth in claim 3, wherein:
    the drive controlling portion performs control so as to change the dryness fraction of the fluid without changing the pressure or the mass velocity of the fluid.

6. The flow state controlling device as set forth in claim 2, wherein:
    the drive controlling portion performs control so as to change the pressure and the dryness fraction of the fluid without changing the mass velocity of the fluid.

7. The flow state controlling device as set forth in claim 3, wherein:
    the drive controlling portion performs control so as to change the pressure and the dryness fraction of the fluid without changing the mass velocity of the fluid.

8. The flow state controlling device as set forth in claim 4, wherein:
    the drive controlling portion performs control so as to change the pressure and the dryness fraction of the fluid without changing the mass velocity of the fluid.

9. The flow state controlling device as set forth in claim 5, wherein:
    the drive controlling portion performs control so as to change the pressure and the dryness fraction of the fluid without changing the mass velocity of the fluid.

10. The flow state controlling device as set forth in claim 2, wherein:
    the drive controlling portion performs control so as to change the mass velocity and the dryness fraction of the fluid without changing the pressure of the fluid.

11. A flow state controlling method using a flow state controlling device to control, to a specified flow state, fluid of a gas/liquid two-phase flow that flows through a flow path, the flow state controlling method comprising:
    a pressure acquiring step wherein the flow state controlling device acquires pressure information relating to pressure of the fluid;
    a mass velocity acquiring step wherein the flow state controlling device acquires mass velocity information relating to the mass velocity of the fluid;
    a dryness fraction acquiring step wherein the flow state controlling device acquires dryness fraction information relating to the dryness fraction of the fluid; and
    a controlling step wherein the flow state controlling device controls, based on the pressure information, the mass velocity information, and the dryness fraction information, a pressure controlling device that is able to change a pressure of the fluid, a mass velocity controlling device that is able to change a mass velocity of the fluid, and a heat controlling device that is able to change the latent heat of the fluid.

12. The flow state controlling method as set forth in claim 11, wherein:
    the controlling step includes:
    a flow state detecting step wherein the flow state controlling device detects a flow state of the fluid at the current point in time based on the pressure information, the mass velocity information, and the dryness fraction information; and
    a drive controlling step wherein the flow state controlling device drives the pressure controlling device, the mass velocity controlling device, and/or the heat controlling device based on the flow state at the current point in time and on the specified flow state.

13. The flow state controlling method as set forth in claim 12, wherein:
    the drive controlling step includes a step wherein the flow state controlling device performs control so as to change the mass velocity of the fluid without changing the pressure or the dryness fraction of the fluid.

14. The flow state controlling step as set forth in claim 12, wherein:
the drive controlling step includes a step wherein the flow state controlling device performs control so as to change the dryness fraction of the fluid without changing the pressure or the mass velocity of the fluid.

15. The flow state controlling step as set forth in claim 13, wherein:
the drive controlling step includes a step wherein the flow state controlling device performs control so as to change the dryness fraction of the fluid without changing the pressure or the mass velocity of the fluid.

16. The flow state controlling method as set forth claim 12, wherein:
the drive controlling step includes a step wherein the flow state controlling device performs control so as to change the pressure and the dryness fraction of the fluid without changing the mass velocity of the fluid.

17. The flow state controlling method as set forth claim 13, wherein:
the drive controlling step includes a step wherein the flow state controlling device performs control so as to change the pressure and the dryness fraction of the fluid without changing the mass velocity of the fluid.

18. The flow state controlling method as set forth claim 14, wherein:
the drive controlling step includes a step wherein the flow state controlling device performs control so as to change the pressure and the dryness fraction of the fluid without changing the mass velocity of the fluid.

19. The flow state controlling method as set forth claim 15, wherein:
the drive controlling step includes a step wherein the flow state controlling device performs control so as to change the pressure and the dryness fraction of the fluid without changing the mass velocity of the fluid.

20. The flow state controlling method as set forth in claim 12, wherein:
the drive controlling step includes a step wherein the flow state controlling device performs control so as to change the mass velocity and the dryness fraction of the fluid without changing the pressure of the fluid.

* * * * *